US011340019B2

(12) United States Patent
Hubbard

(10) Patent No.: US 11,340,019 B2
(45) Date of Patent: May 24, 2022

(54) EVAPORATIVE COOLING SYSTEMS AND METHODS OF USING

(71) Applicant: Purdue Research Foundation, West Lafayette, IN (US)

(72) Inventor: Bryan J. Hubbard, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 0 days.

(21) Appl. No.: 16/662,673

(22) Filed: Oct. 24, 2019

(65) Prior Publication Data

US 2020/0158440 A1     May 21, 2020

Related U.S. Application Data

(60) Provisional application No. 62/750,089, filed on Oct. 24, 2018.

(51) Int. Cl.
| | |
|---|---|
| *F28F 25/08* | (2006.01) |
| *F28C 3/06* | (2006.01) |
| *F28C 3/08* | (2006.01) |
| *F24F 6/12* | (2006.01) |
| *F24F 6/14* | (2006.01) |
| *F24F 6/18* | (2006.01) |
| *F24F 8/192* | (2021.01) |
| *F28F 25/10* | (2006.01) |
| *F28C 1/00* | (2006.01) |

(52) U.S. Cl.
CPC ............... *F28C 3/08* (2013.01); *F28F 25/08* (2013.01); *F28F 25/10* (2013.01); *F28C 2001/006* (2013.01)

(58) Field of Classification Search
CPC .... F24F 5/0035; F24F 6/12; F24F 6/14; F24F 6/18; F24F 8/192; F24F 8/194; F28C 3/08; F28C 3/06; F28F 25/08; F28F 25/087
USPC ...................................................... 62/121, 171
See application file for complete search history.

(56) References Cited

U.S. PATENT DOCUMENTS

| | | | | |
|---|---|---|---|---|
| 2,937,709 | A * | 5/1960 | De Seversky | F24F 6/06 96/45 |
| 4,264,334 | A * | 4/1981 | Durand | C10L 1/22 44/384 |
| 5,518,525 | A * | 5/1996 | Steed | B05B 7/0075 95/58 |
| 6,471,753 | B1 * | 10/2002 | Ahn | B03C 3/16 95/71 |
| 6,500,240 | B1 * | 12/2002 | Tomimatsu | B03C 3/013 239/690 |
| 2014/0090562 | A1 * | 4/2014 | Choi | F24F 3/166 96/53 |

(Continued)

*Primary Examiner* — Frantz F Jules
*Assistant Examiner* — Jason N Thompson
(74) *Attorney, Agent, or Firm* — Hartman Global IP Law; Gary M. Hartman; Domenica N. S. Hartman

(57) ABSTRACT

Systems and methods that involve distributing water droplets onto a media, particular but nonlimiting examples of which include systems and methods for exchanging heat between process water and air in an evaporative cooling system that includes media with a plurality of individual elements each having a surface. The surfaces of at least some of the individual elements individually have a static electrical charge, and the static electrical charges are different among the surfaces of the individual elements.

16 Claims, 4 Drawing Sheets

(56) References Cited

U.S. PATENT DOCUMENTS

2014/0263765 A1* 9/2014 You .................... B05B 7/0483
                                                    239/690
2015/0219346 A1* 8/2015 Morikawa ............. F24F 3/14
                                                    261/136
2015/0292823 A1* 10/2015 Streng ............... B01F 3/04049
                                                    261/146

* cited by examiner

EVAPORATIVE COOLING SYSTEMS AND METHODS OF USING

CROSS-REFERENCE TO RELATED APPLICATION

This application claims the benefit of U.S. Provisional Application No. 62/750,089 filed Oct. 24, 2018, the contents of which are incorporated herein by reference.

BACKGROUND OF THE INVENTION

The present invention generally relates to cooling systems and methods. The invention particularly relates to systems and methods for increasing the efficiency of evaporative cooling towers capable of cooling process water. This section introduces aspects that may help facilitate a better understanding of the disclosure. Accordingly, these statements are to be read in this light and are not to be understood as admissions about what is or is not prior art.

Evaporative cooling towers are used in many commercial and industrial processes to provide cooling for processes such as power generation, industrial manufacturing, building systems, etc. (collectively referred to herein as systems). Such processes may use water (commonly referred to as "process water") to cool portions of the systems by transferring waste heat to the process water. Evaporative cooling towers reduce the temperature of the heated process water by spraying the process water over various types of evaporative media, commonly referred to as cooling tower fill. The evaporative media are typically exposed to flowing atmospheric air within a heat exchanger section of a cooling tower. Heat transfer results from both evaporative and sensible heat exchange between the water and the air, and the waste heat is transferred from the system to the atmosphere. The cooled process water may then be re-circulated into the system to remove additional waste heat. Water may be added to the system to replace process water that has been lost to evaporation or to replace process water that has been removed from the system. The addition of water and removal of existing process water (blow down) also prevents a build-up of chemicals in the process water.

Nonlimiting examples of evaporative cooling towers 10 are schematically represented in FIGS. 1 and 2 as having counter flow and cross flow configurations, respectively. As known in the art, water and air move in opposing directions in a counter flow system, and water moves transverse (e.g., roughly 90 degrees) to air flow in a cross flow system. The major components of such systems 10 include a fan 12 or other suitable means for inducing air to enter the cooling tower 14 through one or more inlets 16 and continue flowing through the tower 14 to an air outlet 18, and a water delivery system 20 that comprises nozzles, pipes, valves, or other suitable devices to distribute the heated process water within the tower 14 onto an evaporative media 22 where the water and incoming air interact to transmit heat from the water to the air. The systems 10 are represented as further including a drift eliminator 24 that captures and coalesces water droplets to reduce the amount of water that might otherwise exit the tower 14 through the fan 12, and a catch basin 26 for collecting the cooled process water that flows from the media 22 and, in the case of the tower 10 in FIG. 2, the cooled process water captured with the drift eliminator 24. Following interaction with the process water, the heated air exits the tower 14 through the outlet 18 to atmosphere.

Evaporative media commonly used in evaporative cooling towers of the types schematically represented in FIGS. 1 and 2 are often formed of polyvinyl chloride (PVC) sheets or bars. Common examples of evaporative media include counter flow film media composed of sheets where water and air move in opposing directions, cross flow film media composed of sheets where water moves ninety degrees to the air flow, and splash bar media which generally includes bars placed in the path of the water with air moving either counter or cross flow to the bars. For all of these types of evaporative media, air is commonly moved through the evaporative media either by a fan (as shown in FIGS. 1 and 2) or a natural draft process. The process water is sprayed above and over the evaporative media and then falls vertically through the evaporative media by gravity.

The evaporative media promote heat exchange between the process water and air, which serves as a heat sink, by providing a contact surface area for both the water and air to interact for the heat exchange process. When the process water contacts the evaporative media, its vertical flow is slowed to provide increased time for the water/air interaction which promotes the heat exchange process. For film media, the droplets adhere to the sheets to form a film of water that spreads over the surfaces of the sheets. The film of water remains in contact with the sheets as the air flows through the evaporative media. For splash bar media, the falling water breaks into droplets as it strikes the bars, thus reducing the speed of the water flow through the media and forming additional water droplets (more surface area) to promote the heat exchange process. In both film and splash bar media, the media serve to reduce the water velocity through the heat exchanger section and increase water surface contact area to exchange heat with the air.

Heat exchange may be improved in film media by increasing the number of sheets within the media and forming patterns in surfaces of the sheets to create a tortuous path to reduce the speed of the process water, increase surface area, and thereby increase air to water surface contact. However, there are limitations as to how much evaporative media and the type of patterns that can be used in a cooling tower. For example, media comprising a significant number of sheets and/or tortuous pathways may produce a high pressure drop that can reduce the efficiency of the overall cooling tower. To overcome increased pressure drop, modifications such as changing the fan size or increasing the horsepower of the fan motor may be necessary as compensation. These modifications change the overall efficiency and cost of the cooling tower.

In addition, media comprising a significant number of sheets and/or tortuous pathways may promote bio-fouling. For example, the formed patterns in the sheets may create areas where water may slow or stagnate, creating areas for bacterial growth in the wet environment that tends to reduce the quality of the process water in the system. The selection of evaporative media for a particular cooling tower may be at least partly based on water quality in the system. Systems with poor water quality that have a high potential for bio-fouling may use film media that have very few patterns formed into the sheets, known as low clog media. Low clog media are less efficient because the process water is not slowed by patterns, thereby reducing the time of water/air interaction. Low clog media typically have reduced surface area for the water/air interaction due to a lack of patterns and because of much larger spacing requirements between sheets to prevent clogging.

In view of the above, it can be appreciated that there is an ongoing desire for systems and methods for exchanging heat between process water and air in evaporative cooling towers.

BRIEF DESCRIPTION OF THE INVENTION

The present invention provides systems and methods that involve distributing water droplets onto a media, particular but nonlimiting examples of which include systems and methods for exchanging heat between process water and air in evaporative cooling towers.

According to one nonlimiting aspect of the invention, an evaporative cooling system includes media comprising a plurality of individual elements each having a surface. The surfaces of at least some of the individual elements individually have a static electrical charge, wherein the static electrical charges are different among the surfaces of the individual elements.

According to another nonlimiting aspect of the invention, a method of using the evaporative cooling system described above includes distributing droplets of a liquid onto the media in the presence of flowing air such that the droplets contact and electrostatically adhere to the individual elements of the media and form a film of the liquid on the individual elements. A first group of the droplets has a positive electrical charge, a second group of the droplets has a negative electrical charge, the first group of droplets is electrically attracted to a first group of the surfaces of the individual elements that have a negative electrical charge, and the second group of droplets is electrically attracted to a second group of the surfaces of the individual elements that have a positive electrical charge.

According to yet another nonlimiting aspect of the invention, a method of cooling heated water in an evaporative cooling system includes providing an evaporative media that comprises surfaces defined by individual elements. The surfaces of first and second groups of the individual elements have static electrical charges that are different from each other. Water droplets of the heated water are distributed onto the evaporative media such that the droplets of the heated water fall onto and coalesce as a water film on the evaporative media. A first group of the droplets has a positive electrical charge, a second group of the droplets has a negative electrical charge, the first group of droplets is electrically attracted to the surfaces of the first group of the individual elements, and the second group of droplets is electrically attracted to the surfaces of the second group of the individual elements. The water film is cooled on the evaporative media with air flowing through the evaporative media.

Technical effects of systems and methods as described above preferably include the capability of increasing the adhesion of water droplets to surfaces of media within a liquid cooling system. As nonlimiting examples, increasing the adhesion of water to surfaces of an evaporative media within a cooling system is capable of promoting the overall heat exchange performance of the cooling system, and increasing the adhesion of water to surfaces of a drift elimination media within a cooling system is capable of reducing the amount of water that escapes from the cooling system.

Other aspects and advantages of this invention will be appreciated from the following detailed description.

DETAILED DESCRIPTION OF THE INVENTION

This disclosure describes evaporative cooling systems and methods intended to promote heat exchange between a liquid and air in a cooling system, a particular example of which is the heat exchange between process water and air in an evaporative cooling tower such that the performance of the evaporative cooling tower may be improved. The systems and methods provide different, preferably opposing, static electrical charges in evaporative media. As used herein, the terms opposing or opposite charges between, for example, elements, refer to a first element having a positive charge and a second element having a negative charge, and does not refer to any specific or relative numeric or measured value of the charges. By providing opposing charges within the media, water droplets that are either positively or negatively charged have increased adhesion to surfaces of the media having opposite charges, promoting wetting and reducing the speed at which a water stream flows through the cooling tower, thereby increasing the time during which heat exchange may occur. The charge of the water droplets will also move upstream through the water stream within the evaporative cooling system. For example, if an element of the evaporative media carries a positive charge, it will repel positively-charged water droplets and a positive charge will be induced in droplets upstream within the water stream. Consequently, droplets that fall near the positively-charged element will tend to be negatively charged, and positively-charged droplets will tend to fall toward negatively charged elements. Similar to Kelvin water drop electrostatic charge generators, a self-sustaining process can be achieved by providing an initial difference in charge between elements of the evaporative media. The difference in charge of the flowing water stream between two oppositely-charged elements can also promote adhesion of water droplet as a result of each element repelling like-charged water droplets into contact with an adjacent oppositely-charged element.

Figure 2:
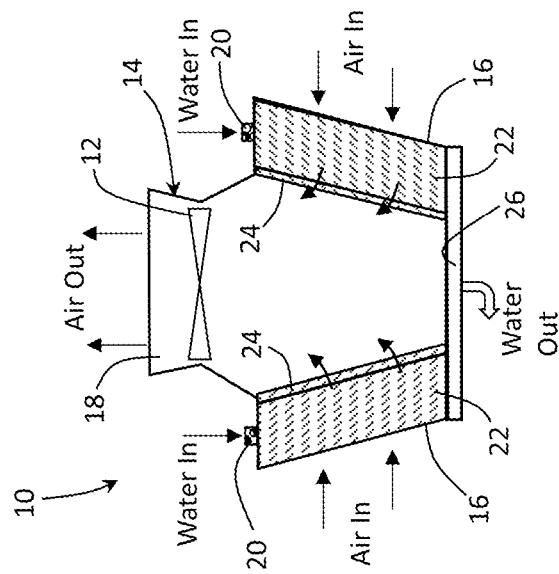
FIGS. 1 and 2 schematically represent cross-sectional views of counter flow and cross flow cooling towers, respectively.
Figure 1:
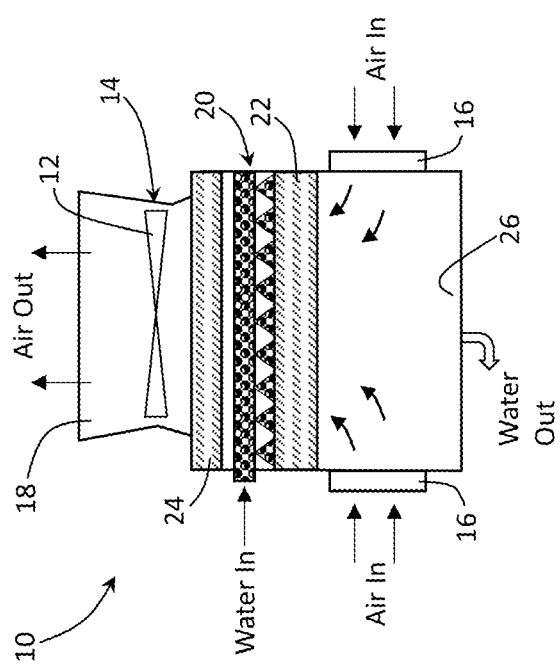
Figure 3B:
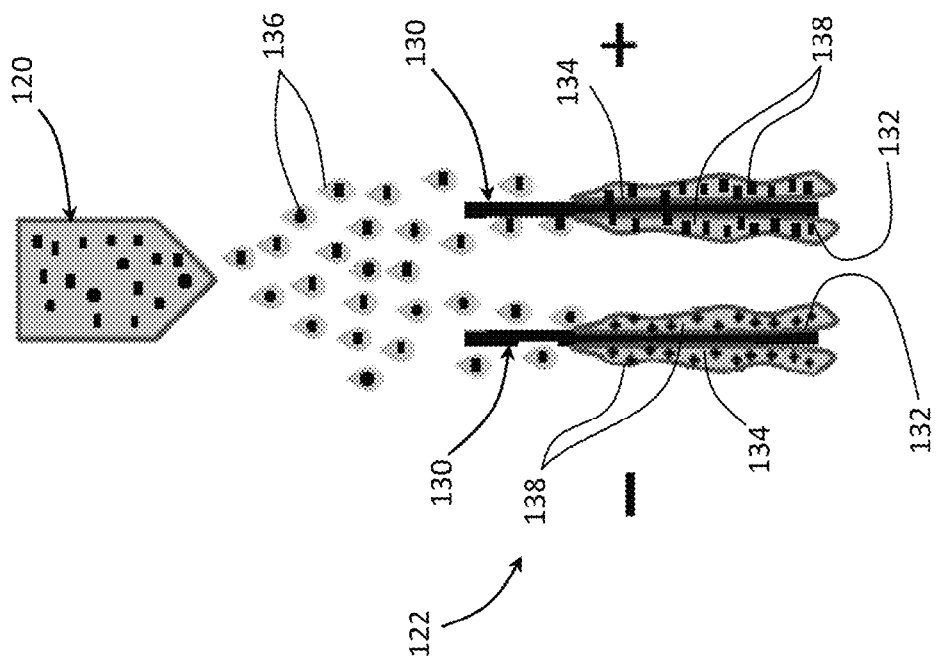
FIG. 3B is a variation of the embodiment in FIG. 3A illustrating that both sides of the sheet may support charge.
Figure 3A:
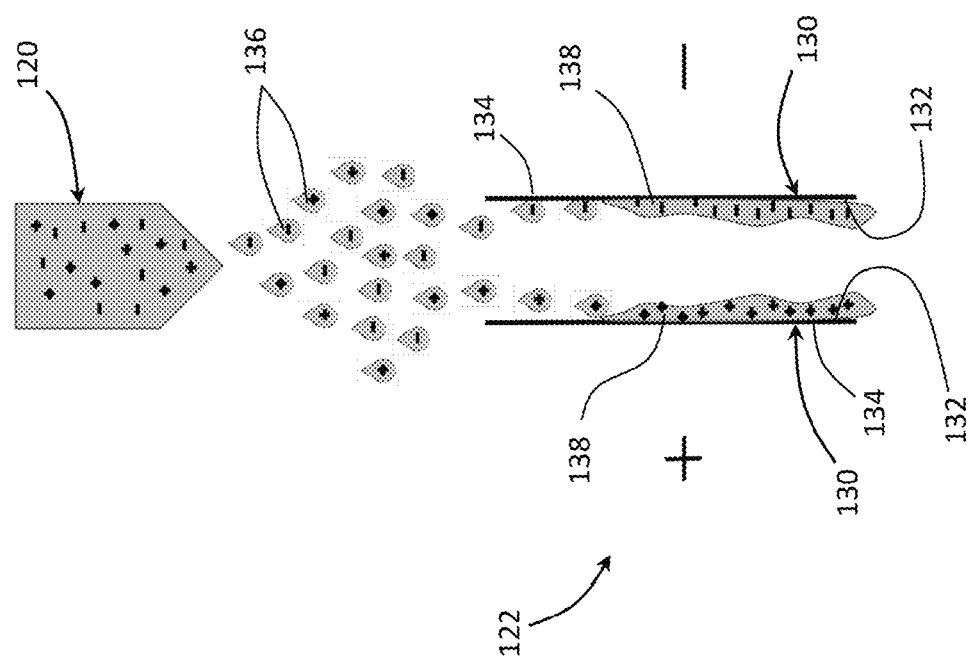
FIG. 3A schematically represents a nonlimiting embodiment of an apparatus and method of promoting heat exchange performance within a cooling tower comprising film media by providing electrical charges to sheets within the film media.
Figure 6:
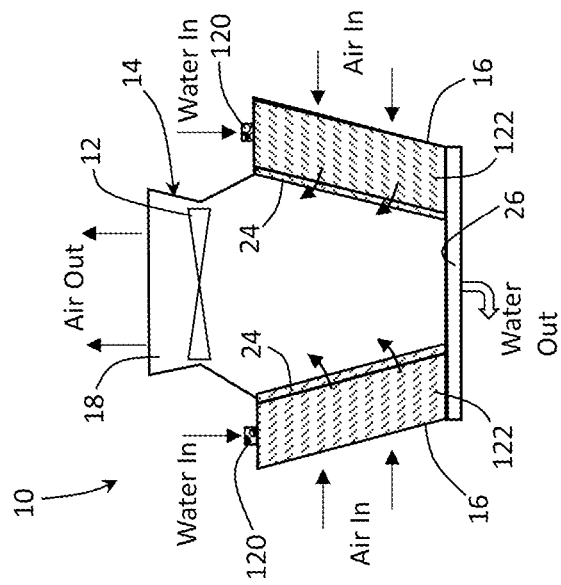
FIGS. 5 and 6 schematically represent either of the film media of FIGS. 3A and 3B installed in the counter flow and cross flow cooling towers of FIGS. 1 and 2, respectively.
Figure 5:
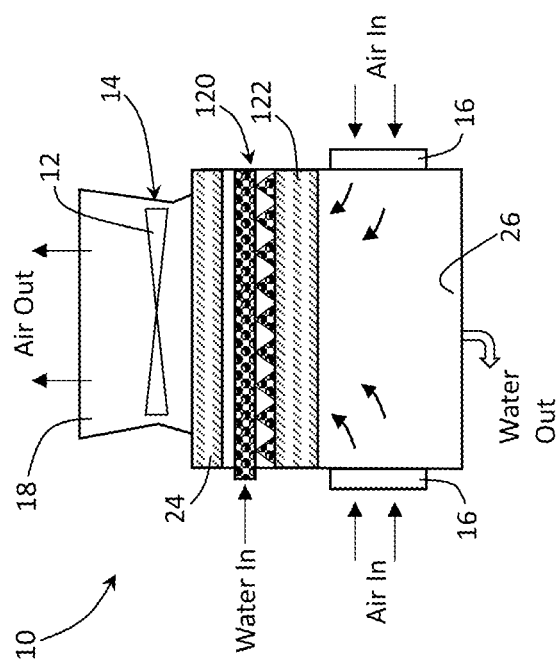

To facilitate the description provided below of the embodiment represented in the drawings, relative terms, including but not limited to, "vertical," "horizontal," "lateral," "front," "rear," "side," "forward," "rearward," "upper," "lower," "above," "below," "right," "left," etc., may be used in reference to a typical installation of the evaporative material within a cooling tower when used to promote heat exchange, nonlimiting examples of which are the evaporative cooling towers 10 schematically represented in FIGS. 1 and 2 as having counter flow and cross flow configurations. Therefore, relative terms are useful to describe installations of the media represented in the drawings, but should not be necessarily interpreted as limiting the scope of the invention. The invention will be described hereinafter in reference to cooling towers with evaporative cooling systems that utilize evaporative media comprising multiple individual elements. Nonlimiting examples of evaporative cooling systems and their evaporative media 122 are represented in FIGS. 3A and 3B, which are schematically represented in FIGS. 5 and 6 as installed in the counter flow and cross flow cooling towers of FIGS. 1 and 2, respectively. The evaporative media 122 are each represented by elements 130 that each have at least two surfaces 132 and 134. Although the evaporative media 122 will be referred to as film media 122 and the elements 130 will be referred to as individual sheets 130 of the film media 130, it will be appreciated that the teachings of the invention are more generally applicable to other types of evaporative cooling systems and evaporative media, such as, but not limited to, cooling towers comprising splash bar media, and such cooling towers may or may not include a drift elimination device.

According to the nonlimiting embodiments depicted in FIGS. 3A and 3B, adjacent sheets 130 have different static electrical charges, either positive or negative. Because water naturally contains both positively and negatively charged ions, when the evaporative media 122 is contacted by process water, for example, by distributing the process water as droplets 136 onto the evaporative media 122 with a water delivery system 120 (e.g., nozzles, pipes, valves, or other suitable devices), negatively and positively charged sheets 130 will electrostatically attract and promote the adhesion of individual droplets 136 that are either, respectively, positively or negatively charged. Furthermore, the electrostatically adhered droplets 136 will tend to form a film 138 of water on one or both surfaces 132 and 134 of each sheet 130. The individual sheets 130 are preferably spaced apart and electrically insulated from each other to prevent charge from transferring between sheets 130 and between the films 138 that have developed on facing surfaces of adjacent sheets 130. Once a specific charge is attained on a sheet 130, the charge may be self-sustaining as water droplets 136 of similar charge to each other will be attracted to sheets 130 of opposite charge and exchange charge with droplets 136 upstream within the water stream. In the nonlimiting embodiments of FIGS. 3A and 3B, each pair of adjacent sheets 130 has an opposing charge. FIG. 3A shows films 138 collecting on only the facing surfaces 132 of two adjacent sheets 130, for example, as a result of only the facing surfaces 132 supporting a static charge. FIG. 3B illustrates that the sheets 130 can be fabricated or otherwise charged so that both surfaces 132 and 134 of each sheet 130 can support a charge, with the result that water films 138 develop on both surfaces 132 and 134 of each of the two sheets 130.

At least some and preferably each individual sheet 130 of the media 122 is configured to individually promote a positive or negative electrical charge. Alternatively or in addition, it is also foreseeable that some sheets 130 may initially have a neutral charge and may maintain the neutral charge or develop a charge opposite that of an adjacent charged sheet 130 during the operation of the evaporative cooling system as a result of being contacted by droplets 136 carrying the same charge as the adjacent sheet 130.

The increased droplet adhesion and/or improved wetting of the sheet surfaces 132 and 134 are able to promote heat transfer between the process water and air flowing through the media 122 when placed in a cooling tower by decreasing the velocity at which the water flows through the cooling tower, thereby increasing the time the water is present in the tower and available to interact with the air flow. Improved adhesion of the water films 138 to the media 122 may also cause the water films 138 to spread more evenly over the sheet surfaces 132 and 134 of the media 122. The more uniform wetting of the surfaces 132 and 134 of the sheets 130 may increase the water/air interaction surface area and improve heat transfer. The negatively and positively charged sheets 130 also support increased heat transfer at the molecular level due to the electrical field perpendicular to the surfaces of the water films 138. Molecular simulations have shown heat transfer may improve because the hydrogen/oxygen molecule orientation at the film surface changes under an electrical field making it easier for the water molecules to move into the airstream and increase the evaporation rate. Experiments in literature have also shown increased drying rates occur when water wetted materials are exposed to an electric field.

Because the process described above may be implemented without changing the number of sheets 130, configuration of the sheets 130, and surface patterns of a particular evaporative media 122, the increase in heat transfer due to the electrical charges may be achieved without increasing the pressure drop or bio-fouling characteristics of the evaporative media 122.

Drift eliminators of cooling towers may also benefit from utilizing charged elements with opposing or at least different static electrical charges for the purpose of improving drift elimination. Drift eliminators (e.g., 24 in FIGS. 1 and 2) contain what is commonly referred to as fill media, film fill, fill material, etc., hereinafter referred to as fill media as a matter of convenience. The counter flow cooling tower 10 represented in FIG. 1 has what may be referred to as a detached drift eliminator 24 located downstream but spaced apart from the evaporative media 22, whereas the tower 10 represented in FIG. 2 has what may be referred to as an integral drift eliminator 24 immediately downstream of the evaporative media 22 and perhaps attached to or integrated with the evaporative media 22. In either case, the fill media of the drift eliminator 24 may comprise charged elements with opposing or at least different static electrical charges to promote adhesion of water droplets to the fill media of the drift eliminator 24, similar to what has been represented in FIGS. 3A and 3B and described above for the evaporative media 122. Improved adhesion of droplets to surfaces of the charged elements of a drift eliminator 24 may cause the captured water droplets to more effectively collect and coalesce on the elements of the drift eliminator 24, after which the water returns by gravity to the evaporative media (e.g., 22 in FIG. 1 or 122 in FIGS. 3A and 3B) of the cooling tower 10 or is funneled back into the catch basin (e.g., 26 in FIG. 2) of the cooling tower 10, thereby reducing the amount of water escaping the cooling tower 10 through the fan (e.g., 12 in FIG. 2). In each case, the air flow through the tower 10 and the fan 12 (or other means) for moving air through the evaporative media 122 also constitute a water delivery system for contacting the surfaces of the elements with the water droplets.

Various methods may be used to provide, induce, or promote specific electrical charges on the film media 122. As a first nonlimiting example, sheets 130 of the film media 122 may be manufactured from electrically conductive materials to which the static electrical charge desired for each sheet 130 is directly applied with a suitable charge source. As another nonlimiting example, the sheets 130 of the film media 122 may be coated with various materials that effect the static electrical charges of the surfaces 132 and 134 by promoting either a positive electric charge or a negative electric charge on the surfaces 132 and 134 of the media 122. These coatings/materials include but are not limited to polytetrafluoroethylene (PTFE) (such as TEFLON®) sprays, polyurethane, and anti-static sprays (alcohol/solvent-based sprays) to promote a specific charge on the sheets 130.

As yet another nonlimiting example, the media 122 can be manufactured to include materials that effect the static electrical charges of the individual sheets 130 by promoting either a positive or negative static charge. For example, to promote a negatively charged system the media 122 may be formed entirely of or to contain (e.g., impregnated) a PTFE-based material or a plastic material impregnated with PTFE. To promote a positive charge, the film media 122 could be formed entirely of or to contain (e.g., impregnated) with nylon (aliphatic or semi-aromatic polyamides) or other positively charged materials. Sheets 130 of film media 122 that are of the same charge but have a different affinity for gaining or losing electrons may also be effective in promoting a charge differential between the sheets 130. For example, a sheet 130 of film media 122 formed entirely of or containing polyvinylchloride (PVC) will have a higher affinity for electrons than a sheet 130 of film media 122 comprised of polypropylene (PP) even though they both carry a negative electrostatic charge. The material with the higher affinity for electrons will attract a more positive charge and the material with the lower affinity for electrons will attract a more negative charge. As such, the sheets 130 may be manufactured of or to contain a variety of materials, nonlimiting examples of which include PTFE, PVC, PP, acrylonitrile butadiene styrene (ABS), and polycarbonate (PC).

Evaporative media 122 are commonly formed of various different types of materials and changes or chemical additions to the sheet compositions may be of negligible cost. Electrically isolating each sheet 130 can be achieved through the use of non-conducting glues and other adhesives used to construct packs of evaporative media sheets 130. As such, the embodiments of FIGS. 3A and 3B may be manufactured by applying different coatings on various surfaces of the sheets 130 and/or fabricating different sheet surfaces of different materials to promote the thermal performance of various existing evaporative media structures.

Previous studies indicate that polymer-based evaporative media that are relatively more hydrophilic (ABS, PC, and PVC) provide improved cooling tower thermal performance relative to polymer-based evaporative media which were relatively more hydrophobic (polyethylene, polypropylene, and PTFE). However, since surface wetting effects are reduced at higher water loading, the benefits of such materials are primarily observed at low water loading conditions. Further, such improvements to efficiency were reduced over time due to a build-up of minerals, etc., on surfaces of the sheets.

Figure 4:
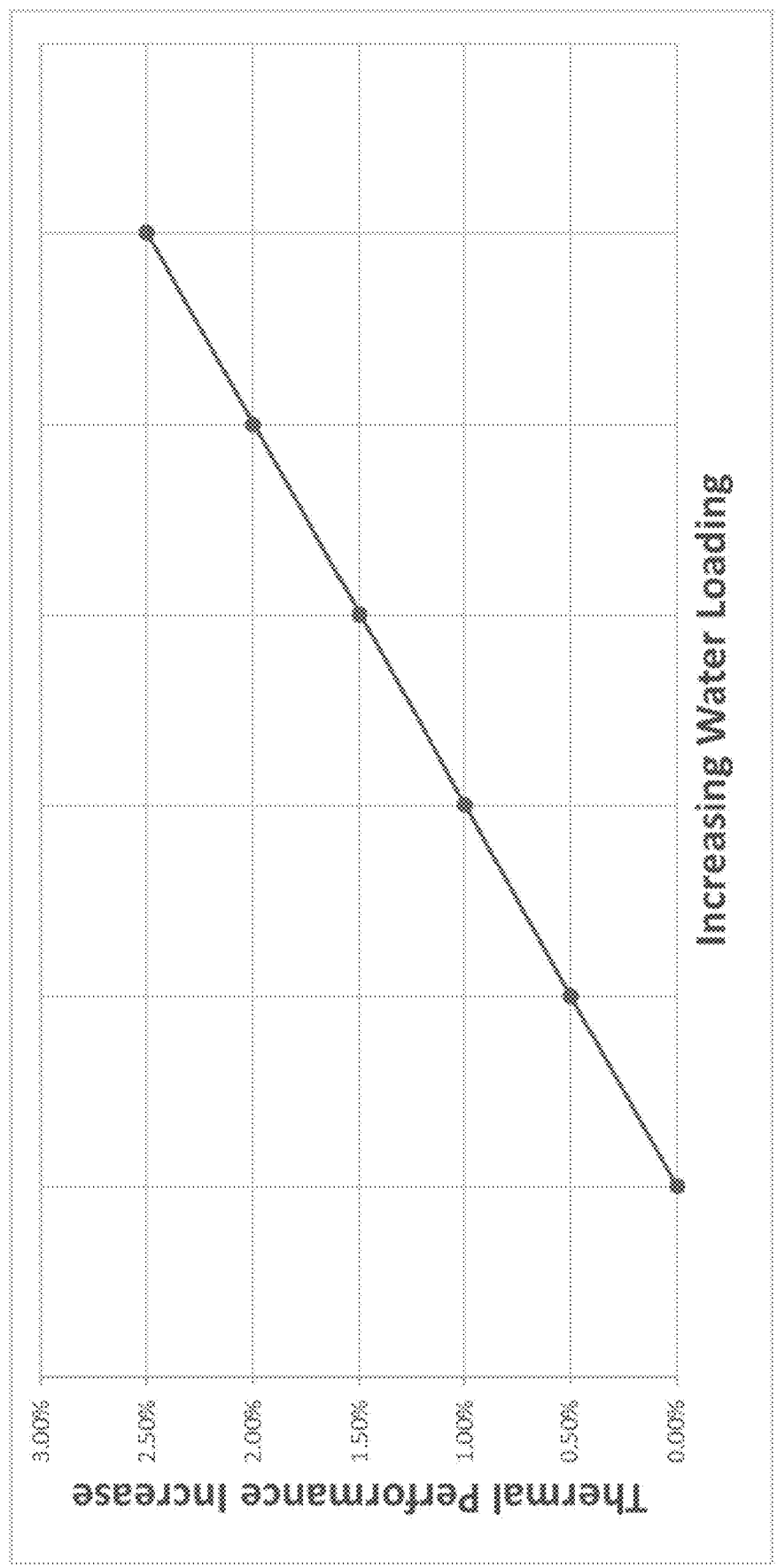
FIG. 4 is a graph representing thermal performance relative to water loading in a cooling tower comprising electrically charged evaporative media.

FIG. 4 is a graph representing thermal performance increase determined for a system incorporating evaporative media 122 as described above. The results were obtained with a standard cooling tower operating air flow rate. As represented, the thermal performance increased with higher water loadings. Unlike previous material selection processes, the system is predicted to maintain its thermal performance increase throughout the life of the evaporative media 122 once the charges in/on its sheets (elements) 130 has been initially obtained.

In view of the above, systems and methods are disclosed herein that are suitable for improving cooling tower performance utilizing naturally-occurring negative and positive ions in water flowing through the cooling tower. Providing evaporative media 122 with alternating positive and negative charged elements 130 (e.g., sheets and/or bars) is believed to increase thermal performance by providing better adhesion of the water droplets 136 to the media 122 and overall slowing the flow rate of the water as it moves through the cooling tower. This increase in thermal performance may be achieved without adversely affecting the pressure drop in the media 122 and without increasing the potential for bio-fouling, since the number, structure, and patterns of the media 122 may remain unchanged.

While the invention has been described in terms of particular embodiments, it is apparent that other forms could be adopted by one skilled in the art. For example, the cooling towers, evaporative media 122, and other components could differ in appearance and construction from the embodiments described herein and shown in the drawings, and appropriate materials could be substituted for those noted. As such, it should be understood that the above detailed description is intended to describe the particular embodiments represented in the drawings and certain but not necessarily all features and aspects thereof, and to identify certain but not necessarily all alternatives to the represented embodiments and described features and aspects. As a nonlimiting example, the invention encompasses additional or alternative embodiments in which one or more features or aspects of a particular embodiment could be eliminated or two or more features or aspects of different embodiments could be combined. Accordingly, it should be understood that the invention is not necessarily limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. An evaporative cooling system that operates to cool a stream of a liquid with air as the stream flows through the system in a downstream direction of the stream, the system comprising:
    evaporative media comprising a plurality of individual elements each having a surface, at least some of the individual elements containing materials that effect static electrical charges at the surfaces of the at least some of the individual elements by promoting either a first static electrical charge or a second static electrical charge on the surfaces;
    a delivery system that distributes positively charged droplets and negatively charged droplets in the stream of the liquid on the surfaces of the at least some of the individual elements, the delivery system delivering the stream of the liquid so that positive charges and negative charges of the positively charged droplets and the negatively charged droplets move in an upstream direction of the stream of the liquid within the evaporative cooling system; and
    means for moving the air through the evaporative media and cooling the stream of the liquid by transferring at least some heat from the stream of the liquid to the air by evaporation of a portion of the liquid.

2. The evaporative cooling system of claim 1, further comprising fill media of a drift eliminator in the downstream direction from the evaporative media, the fill media having surfaces defined by individual elements of the fill media, the surfaces of first and second groups of the individual elements of the fill media having static electrical charges that are opposite or different from each other.

3. The evaporative cooling system of claim 1, wherein the surfaces have coatings thereon that are formed of the materials that effect the static electrical charges of the individual elements.

4. The evaporative cooling system of claim 1, wherein each of the individual elements is entirely formed of one of the materials that effects the static electrical charges thereof.

5. The evaporative cooling system of claim 1, wherein the first static electrical charges of the surfaces of a first group of the individual elements are opposite the second static electrical charges of the surfaces of a second group of the individual elements.

6. The evaporative cooling system of claim 1, wherein the surfaces of an adjacent pair of the individual elements are facing surfaces that face each other, the facing surface of a first of the adjacent pair has a positive static electrical charge, and the facing surface of a second of the adjacent pair has a negative static electrical charge.

7. The evaporative cooling system of claim 1, wherein the surfaces of the individual elements that have different static electrical charges are electrically insulated from one another.

8. The evaporative cooling system of claim 1, wherein a first group of the surfaces has a different affinity for electrons than a second group of the surfaces.

9. A method of using the evaporative cooling system of claim 1 to cool the liquid with the air, the method comprising:
distributing the positively charged droplets and the negatively charged droplets in the stream of the liquid onto the evaporative media in the presence of the air flowing such that the positively charged droplets and the negatively charged droplets contact and electrostatically adhere to the individual elements of the evaporative media and the positively charged droplets and the negatively charged droplets form a film of the liquid on the individual elements, wherein the positively charged droplets are electrically attracted to a first group of the surfaces of the individual elements that have a negative static electrical charge, and the negatively charged droplets are electrically attracted to a second group of the surfaces of the individual elements that have a positive static electrical charge.

10. The method of claim 9, further comprising distributing additional droplets of the liquid with a drift eliminator located in the downstream direction from the evaporative media, the additional droplets being different droplets than the positively charged droplets and the negatively charged droplets distributed on the surfaces of the at least some of the individual elements, the additional droplets being distributed with the air onto fill media of the drift eliminator that electrostatically captures and coalesces the additional droplets of the liquid with charged elements of the fill media.

11. A method of cooling a stream of heated water with air as the stream flows through an evaporative cooling system in a downstream direction of the stream, the method comprising:
providing an evaporative media within the evaporative cooling system, the evaporative media comprising surfaces defined by individual elements, wherein the surfaces of first and second groups of the individual elements contain materials that effect static electrical charges at the surfaces by promoting a first static electrical charge on the surfaces of the first group of the individual elements and promoting a second static electrical charge on the surfaces of the second group of the individual elements;
distributing positively charged droplets and negatively charged droplets in the stream of the heated water onto the evaporative media such that the positively charged droplets and the negatively charged droplets of the heated water fall onto the evaporative media, the positively charged droplets and the negatively charged droplets of the heated water are electrostatically adhered to the individual elements, and the positively charged droplets and the negatively charged droplets of the heated water coalesce as a water film on the evaporative media, wherein the positively charged droplets are electrically attracted to the surfaces of the first group of the individual elements, and the negatively charged droplets are electrically attracted to the surfaces of the second group of the individual elements and positive charges and negative charges of the positively charged droplets and the negatively charged droplets move in an upstream direction of the stream of the heated water within the evaporative cooling system; and
cooling the water film on the evaporative media with the air flowing through the evaporative media by transferring at least some heat from the heated water to the air by evaporation of a portion of the heated water.

12. The method of claim 11, wherein each of the individual elements is entirely formed of one of the materials that effect the static electrical charges of the individual elements.

13. The method of claim 11, wherein the surfaces have coatings thereon that are formed of the materials that effect the static electrical charges of the surfaces of the individual elements.

14. The method of claim 11, wherein the static electrical charges of the surfaces of the first group of the individual elements are opposite the static electrical charges of the surfaces of the second group of the individual elements.

15. The method of claim 11, wherein at least some of the surfaces of the first and second groups of the individual elements constitute adjacent pairs of facing surfaces, the facing surfaces of the first group of the individual elements have positive static electrical charges, and the facing surfaces of the second group of the individual elements have negative static electrical charges.

16. The method of claim 11, further comprising:
providing a drift eliminator located within the evaporative cooling system in the downstream direction from the evaporative media, the drift eliminator comprising fill media having surfaces defined by individual elements of the fill media, wherein the surfaces of first and second groups of the individual elements of the fill media have static electrical charges that are different from each other;
capturing additional water droplets with the drift eliminator, the additional water droplets being different droplets than the positively charged droplets and the negatively charged droplets of the heated water that are distributed onto the evaporative media, the additional water droplets being captured with the surfaces defined by the individual elements of the fill media; and then
either returning the additional water droplets to the evaporative media or collecting the additional water droplets in a basin.

* * * * *